United States Patent
Watanabe

(10) Patent No.: US 11,885,640 B2
(45) Date of Patent: Jan. 30, 2024

(54) MAP GENERATION DEVICE AND MAP GENERATION METHOD

(71) Applicant: DENSO CORPORATION, Kariya (JP)

(72) Inventor: Takayuki Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 331 days.

(21) Appl. No.: 17/186,919

(22) Filed: Feb. 26, 2021

(65) Prior Publication Data

US 2021/0180982 A1    Jun. 17, 2021

Related U.S. Application Data

(63) Continuation of application No. PCT/JP2019/033513, filed on Aug. 27, 2019.

(30) Foreign Application Priority Data

Aug. 31, 2018 (JP) .................................. 2018-163071
Jul. 29, 2019 (JP) .................................. 2019-138796

(51) Int. Cl.
*G01C 21/00* (2006.01)

(52) U.S. Cl.
CPC ..... *G01C 21/3841* (2020.08); *G01C 21/3815* (2020.08)

(58) Field of Classification Search
CPC ......................... G01C 21/3841; G01C 21/3815
See application file for complete search history.

(56) References Cited

U.S. PATENT DOCUMENTS

| 2018/0023961 A1 | 1/2018 | Fridman |
| 2018/0216954 A1* | 8/2018 | Kitagawa ........... G01C 21/3867 |
| 2020/0018607 A1* | 1/2020 | Balu ..................... H04W 12/02 |

* cited by examiner

*Primary Examiner* — Faris S Almatrahi
*Assistant Examiner* — Sahar Motazedi
(74) *Attorney, Agent, or Firm* — MASCHOFF BRENNAN

(57) ABSTRACT

A map generation device according to one embodiment includes a reception unit that receives probe data transmitted from at least one vehicle and indicating a feature detected in vehicle surroundings by an environment monitoring sensor incorporated in the vehicle, and the device creates or updates map data based on the probe data received by the reception unit. The map generation device includes: a characteristic determination unit that determines whether the probe data includes sufficient characteristic information usable for alignment with other probe data or map data; and a combining unit that joins a target probe data set including an insufficient amount of characteristic information to the probe data previous or subsequent to the target probe data set in consecutive probe data sets acquired from the same travel of the same vehicle.

5 Claims, 10 Drawing Sheets

FIG.11

| DETECTION TARGET | | EXAMPLE IMAGE |
|---|---|---|
| SIGN | CIRCLE | |
| | SQUARE | |
| | RHOMBUS | |
| | TRIANGLE | |
| | OCTAGON | |
| SIGNBOARD | BLUISH | |
| | YELLOWISH | |
| | GREENISH | |
| ROAD SURFACE MARKING | | |
| TRAFFIC SIGNAL | | |
| POLES | | |

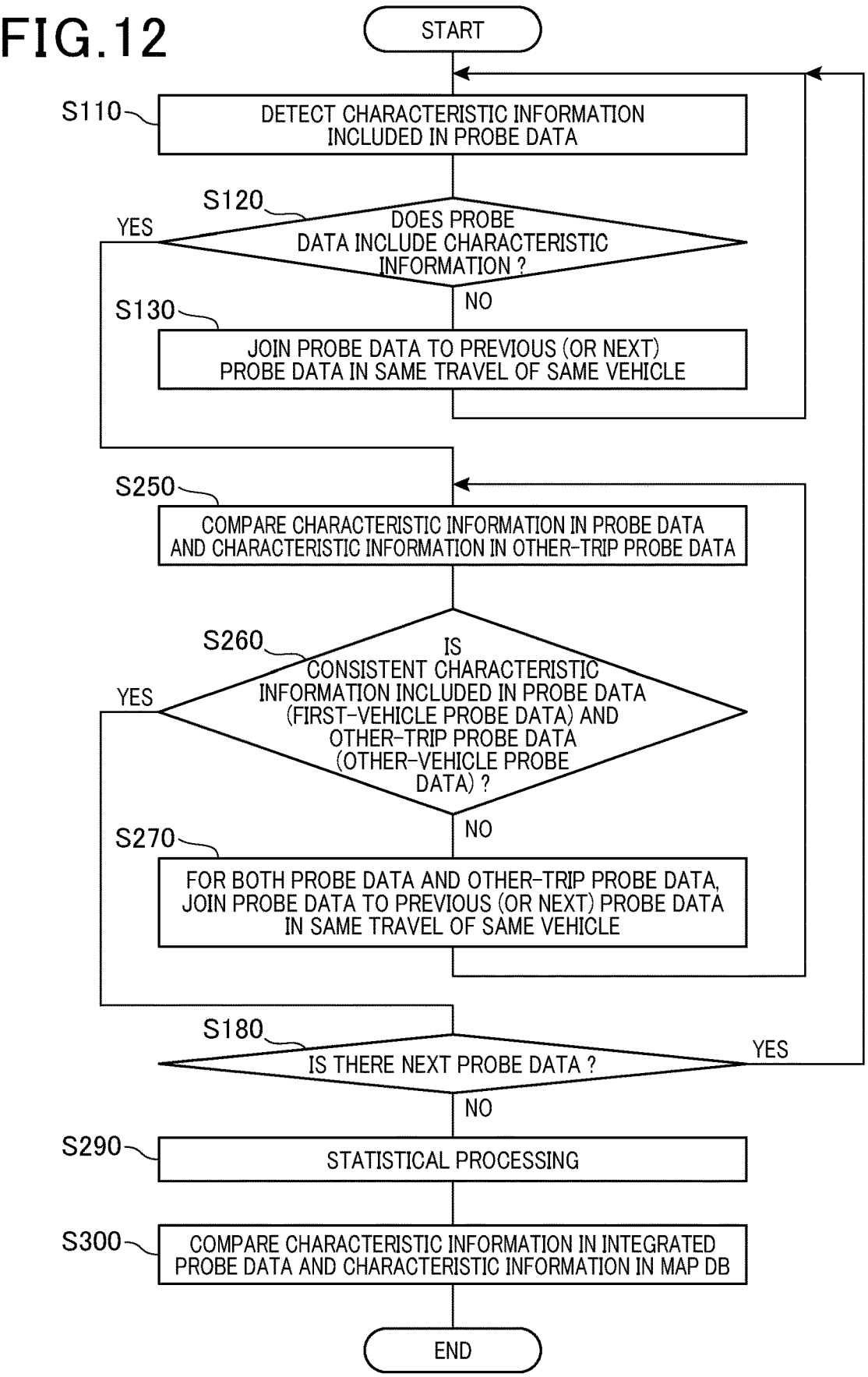

MAP GENERATION DEVICE AND MAP GENERATION METHOD

CROSS-REFERENCE TO RELATED APPLICATIONS

The present application is a continuation application of International Application No. PCT/JP2019/033513, filed on Aug. 27, 2019, which claims priority to Japanese Patent Application No. 2018-163071 filed on Aug. 31, 2018 and Japanese Patent Application No. 2019-138796 filed on Jul. 29, 2019. The contents of these applications are incorporated herein by reference in their entirety.

BACKGROUND

1. Technical Field

The present disclosure relates to a map generation device and a map generation method.

2. Related Art

Map data used in an on-vehicle navigation device or an on-vehicle driving support device is generated by a known method such as a following technique. A vehicle incorporates an on-vehicle device that acquires probe data, which is then transmitted from the on-vehicle device to a data center. The data center receives and uses a plurality of probe data sets to statistically generate sign information and information about markings such as white lines.

SUMMARY

The present disclosure provides a map generation device. As an aspect of the present disclosure, a map generation device includes a reception unit that receives probe data transmitted from at least one vehicle and indicating a feature detected in vehicle surroundings by an environment monitoring sensor incorporated in the vehicle, and the device creates or updates map data based on the probe data received by the reception unit. The map generation device includes a characteristic determination unit and a combining unit. The characteristic determination unit determines whether the probe data includes sufficient characteristic information usable for alignment with other probe data or map data. The combining unit joins a target probe data set including an insufficient amount of characteristic information to the probe data previous or subsequent to the target probe data set in consecutive probe data sets acquired from the same travel of the same vehicle.

BRIEF DESCRIPTION OF THE DRAWINGS

In the accompanying drawings:

FIG. 11 is a diagram illustrating landmarks to be detected; and

FIG. 12 is a flowchart showing an exemplary process of combining probe data according to a second embodiment.

DETAILED DESCRIPTION OF THE PREFERRED EMBODIMENTS

Generating or updating map data involves a process of aligning probe data with the map data. US 2018/0023961 A1 (hereinafter referred to as Patent Literature 1), however, provides little description of such a process of aligning probe data. Patent Literature 1 describes an alignment method that uses GPS data included in probe data. However, conventionally known GPS data includes significant errors, which may cause a failure in appropriate alignment that uses GPS data.

An objective of the present disclosure is to provide a map generation device and a map generation method that enable easy alignment of probe data.

A map generation device according to an aspect of the present disclosure includes a reception unit that receives probe data transmitted from at least one vehicle and indicating a feature detected in vehicle surroundings by an environment monitoring sensor incorporated in the vehicle, and the device creates or updates map data based on the probe data received by the reception unit. The map generation device includes: a characteristic determination unit that determines whether the probe data includes sufficient characteristic information usable for alignment with other probe data or map data; and a combining unit that joins a target probe data set including an insufficient amount of characteristic information to the probe data previous or subsequent to the target probe data set in consecutive probe data sets acquired from the same travel of the same vehicle.

A map generation method according to an aspect of the present disclosure is implemented by at least one processor for creating or updating map data based on probe data indicating a feature detected in vehicle surroundings by an environment monitoring sensor incorporated in a vehicle. The map generation method includes: receiving the probe data from at least one vehicle; determining whether the probe data includes sufficient characteristic information usable for alignment with other probe data or map data; and joining a target probe data set including an insufficient amount of characteristic information to the probe data set previous or subsequent to the target probe data set in consecutive probe data sets acquired from the same travel of the same vehicle.

The above and other objects, features, and advantages of the present disclosure will be clearly apparent from the detailed description provided below with reference to the accompanying drawings.

First Embodiment

Figure 1:
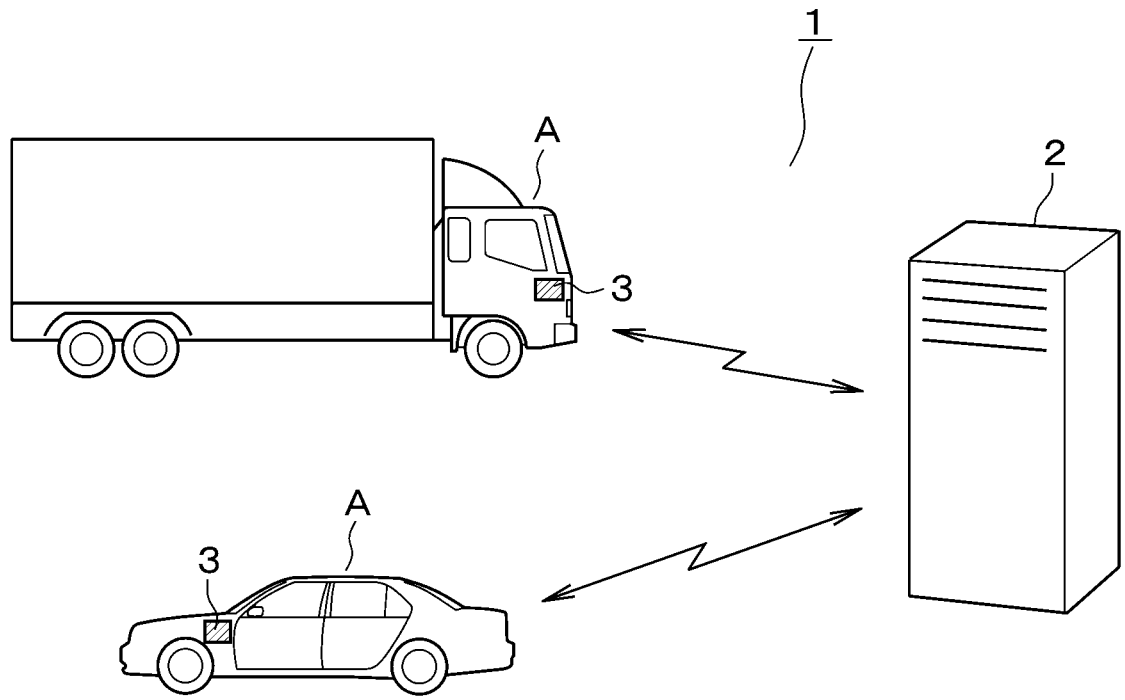
FIG. 1 is a schematic diagram illustrating an overview of a system according to a first embodiment.

A first embodiment of the present disclosure will now be described with reference to FIGS. 1 to 10. FIG. 1 is a schematic diagram illustrating an overview of a map generation system 1 according to the present embodiment. The map generation system 1 includes a data center 2 that collects and analyzes probe data, and generates or updates map data, and multiple vehicles A traveling on roads. More specifically, the vehicles A include general automobiles such as passenger cars and tracks.

Figure 2:
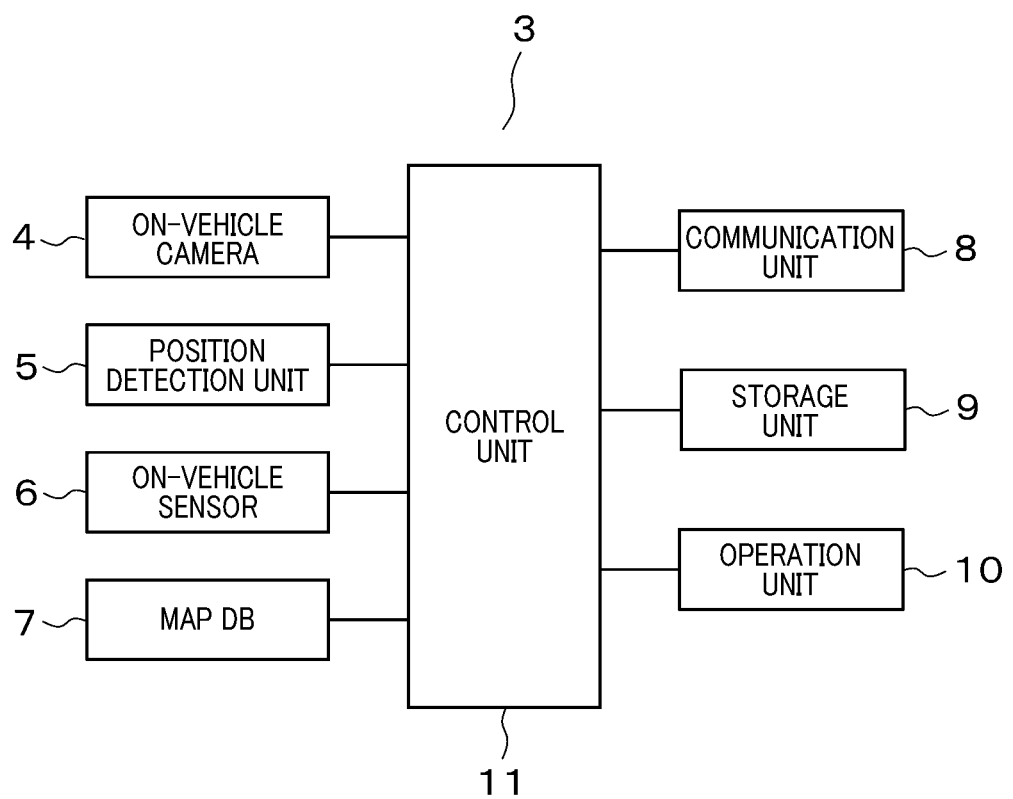
FIG. 2 is a schematic block diagram illustrating the configuration of an on-vehicle device.

Each vehicle A incorporates an on-vehicle device 3 for the map generation system 1. As shown in FIG. 2, the on-vehicle device 3 includes an on-vehicle camera 4, a position detection unit 5, on-vehicle sensors 6 of various types, a map database 7, a communication unit 8, a storage unit 9, an operation unit 10, and a control unit 11. The on-vehicle camera 4 is installed, for example, on the front of the vehicle A to capture an image of at least the state of the road ahead. The on-vehicle camera 4 functions as an environment monitoring sensor.

The position detection unit 5 detects the vehicle location based on, for example, data received by a global navigation satellite system (GNSS) receiver. The on-vehicle sensors 6 of various types detect vehicle information such as the speed and the traveling direction, that is, the orientation. The on-vehicle camera 4 may be installed on each of the front, the rear, the right, and the left of the vehicle A. The on-vehicle camera 4 may be a wide-angle camera. In particular, the front camera is desired to be a camera with at least two objective lenses.

The map database 7 may store map data about the whole country. For example, the map data may include road data indicating road networks and feature data that indicates the positions and the types of features along roads. The feature data includes landmark information and lane marking information. The landmark information may include the types, the position coordinates, the colors, the sizes, and the shapes of landmarks (objects) along roads. The types of landmarks may be a signboard, a traffic signal, a sign, a pole, a crosswalk, a road surface marking such as a stop line, and a manhole. The lane marking information includes the position coordinates of lane markings and information that indicates whether lane markings are solid lines, dashed lines, or Botts' dots. The positions of lane markings are represented as the coordinate sets of the positions of the lane markings, that is, points. In other embodiments, lane markings may be polynomial representations. The lane marking information may be lines represented by polynomials. The map data may include a travel path model. The travel path model is path data generated by statistically integrating the trajectories of multiple vehicles. The travel path model is, for example, the average of the trajectories for each traffic lane. The travel path model corresponds to data indicating travel paths followed during autonomous driving.

The communication unit 8 communicates with the data center 2 through, for example, a mobile communication network or road-to-vehicle communication. In the storage unit 9, camera image data captured by the on-vehicle camera 4 is stored together with data such as the vehicle location, the traveling speed, the traveling direction, and the shooting date and time of the image capture, as well as probe data generated based on the camera image data is also stored. The storage unit 9 further stores various sets of data and programs. The probe data will be described in detail later. The operation unit 10 includes a touch panel, a switch, and a display (not shown), through which a user of the vehicle A, such as a driver, performs necessary operations.

The control unit 11 includes a computer and has the function of controlling the entire on-vehicle device 3. In this case, the control unit 11 causes the on-vehicle camera 4 to always capture images of the state of the road ahead while the vehicle A is traveling, and the storage unit 9 to store the camera image data together with the vehicle location data. The control unit 11 then performs image recognition processing on the camera image data to generate probe data including road sign information and information about pavement markings such as white lines on roads, and stores the generated probe data into the storage unit 9. The camera image data forms data detected by the environment monitoring sensor 4. The control unit 11 also causes the communication unit 8 to transmit probe data stored in the storage unit 9 to the data center 2 regularly, for example, once or a few times a day or every given time such as every one or few seconds or every several hundred milliseconds.

Figure 3:
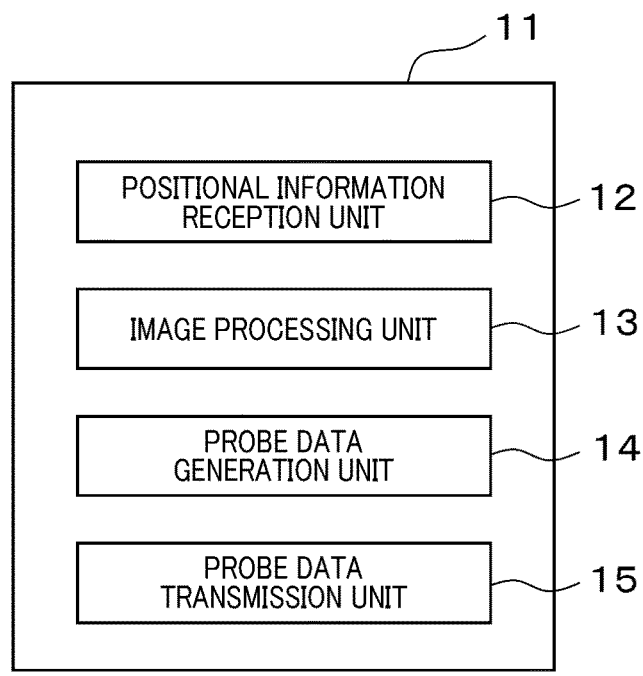
FIG. 3 is a block diagram of a control unit in the on-vehicle device.

The control unit 11, as shown in FIG. 3, includes a positional information reception unit 12, an image processing unit 13, a probe data generation unit 14, and a probe data transmission unit 15. The positional information reception unit 12 receives positional information, that is, a GNSS signal from the position detection unit 5, acquires current location information on the vehicle, that is, vehicle location information based on the GNSS signal, and stores the acquired current location information into the storage unit 9. The image processing unit 13 performs image recognition processing on camera image data captured by the on-vehicle camera 4 and stored in the storage unit 9. The probe data generation unit 14 generates probe data based on the results of the image recognition by the image processing unit 13, and stores the generated probe data into the storage unit 9. The probe data transmission unit 15 transmits probe data stored in the storage unit 9 to the data center 2 via the communication unit 8.

Figure 4:
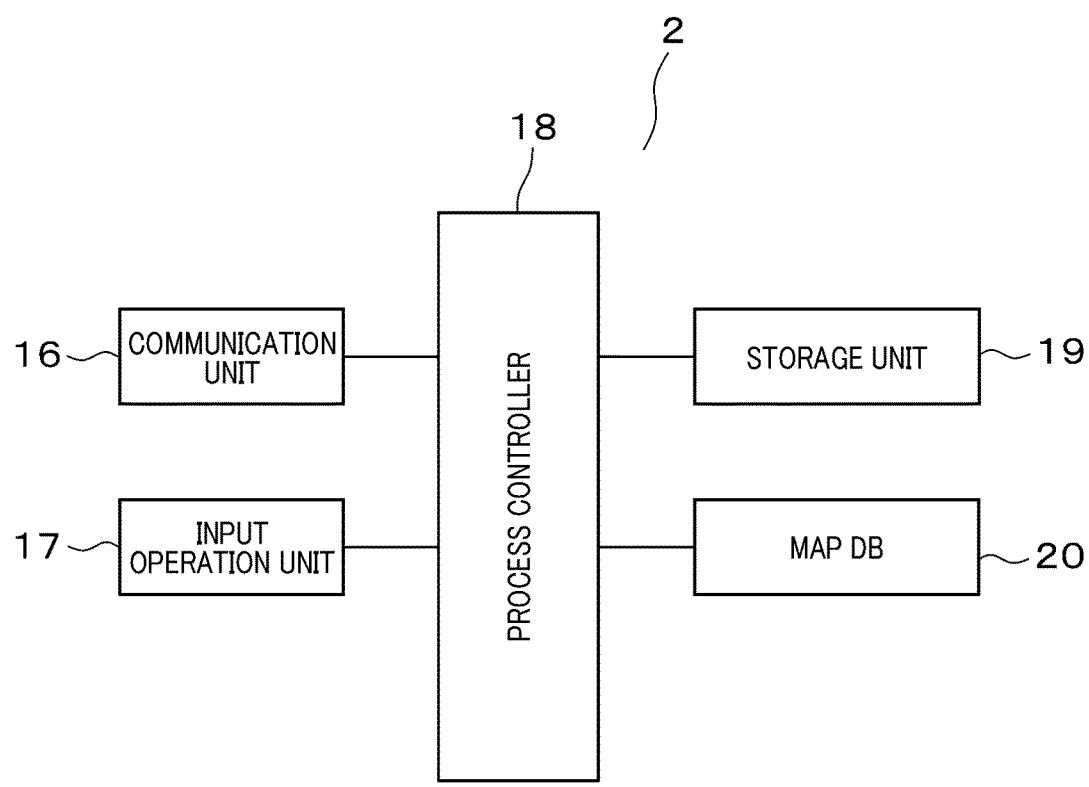
FIG. 4 is a schematic block diagram illustrating the configuration of the main part of a data center.

The data center 2, as shown in FIG. 4, includes a communication unit 16, an input operation unit 17, a process controller 18, a storage unit 19, and a map database 20. The communication unit 16 communicates with the communication unit 8 of each vehicle A to receive the probe data. The communication unit 16 functions as a reception unit. The input operation unit 17 includes a keyboard, a mouse, a switch, and a display (not shown) that allow an operator to perform necessary input operations.

The process controller 18 is mainly a computer and has the function of controlling the entire data center 2, or in other words, functions as a control unit. In addition, the process controller 18 executes processing for generating or updating map data. The storage unit 19 collects and stores probe data transmitted from each vehicle A. The storage unit 19 in this process collects and stores massive amounts of probe data collected from, for example, ordinary vehicles A traveling in Japan. The map database 20 stores the generated accurate map data.

In the map data generation processing executed by the process controller 18, the process controller 18 also executes processing for aligning the probe data with map data. In this case, if the probe data includes no characteristic information such as pavement marking shape information or road sign information, probe data alignment is difficult. To overcome the difficulty, in the present embodiment, probe data without the characteristic information, or probe data difficult to align, is merged with probe data including the characteristic information, or alignable probe data. In other words, processing for creating combined probe data is executed to transform difficult-to-align probe data into alignable probe data. The combined probe data is stored into the storage unit 19. The combining process will be described in detail later. The process controller 18 functions as a characteristic determination unit and a combining unit.

Figure 5:
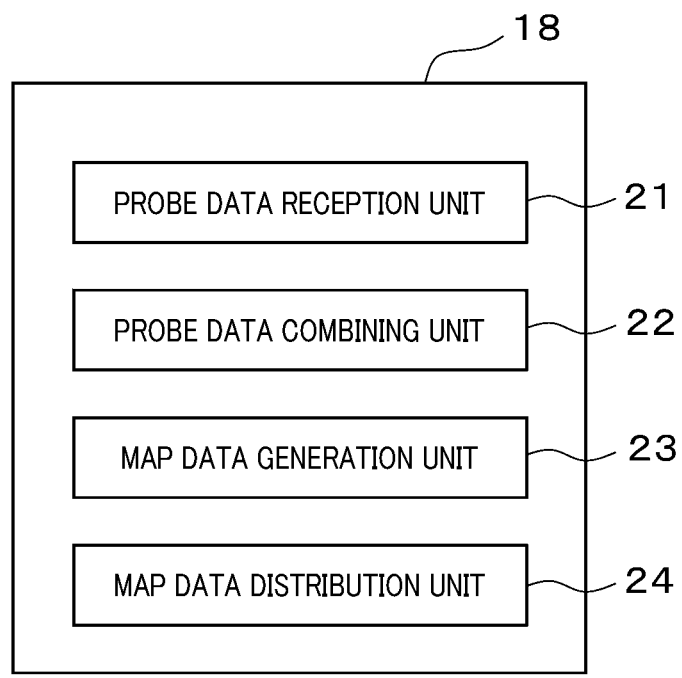
FIG. 5 is a block diagram of a process controller in the data center.

The process controller 18, as shown in FIG. 5, includes a probe data reception unit 21, a probe data combining unit 22, a map data generation unit 23, and a map data distribution unit 24. The probe data reception unit 21 receives, via the communication unit 16, probe data transmitted from each vehicle A, and stores the received probe data into the storage unit 19. The probe data combining unit 22 detects the presence or absence of characteristic information in the probe data stored in the storage unit 19, merges probe data without characteristic information with probe data including characteristic information, and stores the combined probe data into the storage unit 19. The map data generation unit 23 generates map data or updates map data based on the probe data and the combined probe data stored in the storage unit 19. The generated or updated map data is stored into the map database 20. The map data distribution unit 24 transmits the generated or updated map data to each vehicle A via the communication unit 16.

The control unit 11 in the on-vehicle device 3 of each vehicle A, every time the vehicle A travels a predetermined distance or at predetermined time intervals, performs image recognition processing on the camera image data captured by the on-vehicle camera 4 during the period of time to execute processing for generating probe data. In this case, the processing for image recognition on the camera image data and the processing for generation of the probe data are set to be executed, for example, every 100 milliseconds. The control unit 11 transmits a collection of, for example, 400-ms probe data to the data center 2, or in other words, transmits probe data to the data center 2, for example, every 400 milliseconds. The probe data generated includes various types of data such as the shape data on pavement markings, or data including information about the line types and the colors of pavement markings, the position data on road signs or signboards, or data including information about the sizes, the types, the meanings, and the like of road signs and signboards, the position data on poles such as telephone poles, or data including information about the thicknesses, the heights, and the types of poles such as telephone poles, the data on road surface markings such as stop lines and crosswalks, and the position data on traffic signals, or data including information about the sizes and the types of traffic signals. The probe data may also include trajectory data indicating the motion path of the vehicle A. That is, at least one of the various types of data is recognized by image recognition processing on the camera image data and formed as probe data including the recognition result data. The motion path corresponds to the time-series data on the position coordinates of the vehicle. The positional information about the vehicle may be calculated based on, for example, the GPS information. Of course, the location may be identified by dead reckoning or localization. The localization refers to processing for locating the vehicle based on relative positional information between the vehicle and a landmark imaged by the on-vehicle camera 4, such as information indicating the distance between the vehicle and the landmark and the coordinates of the landmark included in the map data. The relative position of the landmark imaged by the on-vehicle camera 4 to the vehicle can be identified by analyzing the image captured by the on-vehicle camera 4.

Although the probe data in the present embodiment is generated based on the camera image data captured by the on-vehicle camera 4, this is not restrictive. For a vehicle incorporating, for example, a millimeter-wave radar system or a lidar system such as a SPAD lidar system as an environment monitoring sensor, probe data may be generated based on the detection results from the millimeter-wave radar system or the lidar system. In this case, the probe data may be generated using a combination of image recognition processing on the camera image data and the results of detection by the millimeter-wave radar system or the lidar system. Alternatively, the probe data may be generated based merely on the results of detection by the millimeter-wave radar system or the lidar system. The millimeter-wave radar system or the lidar system functions as an environment monitoring sensor. The results of detection by the millimeter-wave radar system or the lidar system form data detected by the environment monitoring sensor 4. The environment monitoring sensor may be chosen from a wide variety of sensors capable of detecting features in vehicle surroundings, such as an on-vehicle camera, a millimeter-wave radar system, and a lidar system. The environment monitoring sensor may be a device having a sensing range in the rearward or the side of the vehicle. The control unit 11 may use different types of environment monitoring sensors in combination to generate probe data. For example, an environment monitoring sensor including a combination of the on-vehicle camera 4 and a millimeter-wave radar system can detect the distance from a landmark with higher accuracy. Also in the nighttime or other environments in which the on-vehicle camera 4 recognizes a landmark with lower accuracy, the complementary use of detection results from the millimeter-wave radar system enables a landmark to be reliably recognized at a given recognition rate. A combination of the on-vehicle camera 4 and a lidar system has the same advantages.

When the probe data is created, detection targets are detected by the on-vehicle camera 4 or the millimeter-wave radar system or the lidar system. The detection targets, that is, landmarks to be detected will now be described with reference to FIG. 11. As shown in FIG. 11, when the detection targets are signs, the shapes of the signs, such as a circle, a square, a rhombus, a triangle, and an octagon are detected, and also the meanings of the signs are detected as appropriate. When the detection targets are signboards, for example, bluish, yellowish, and greenish signboards are detected, and also the meanings of the characters and the designs of signboards are detected as appropriate. When the detection targets are road surface markings, markings drawn on road surfaces are detected, such as an arrow, a rhombus, a stop marking, a speed, a stop line, a crosswalk, and a white line. When the detection targets are traffic signals, for example, three-color traffic lights are detected. When the detection targets are poles, poles such as a telephone pole and a streetlight pole are detected.

Each probe data set is assigned with the vehicle ID of the vehicle A and a time stamp, that is, information on the data identifying the chronological order in which probe data sets are created. The time stamp information may be replaced with serial number information. This enables, from the probe data collected in the data center 2, identification and extraction of a route of a vehicle, that is, the consecutive probe data sets in a travel from engine start to engine stop. In the present embodiment, probe data sets during travel of a vehicle are subjected to a combining process.

Figure 6:
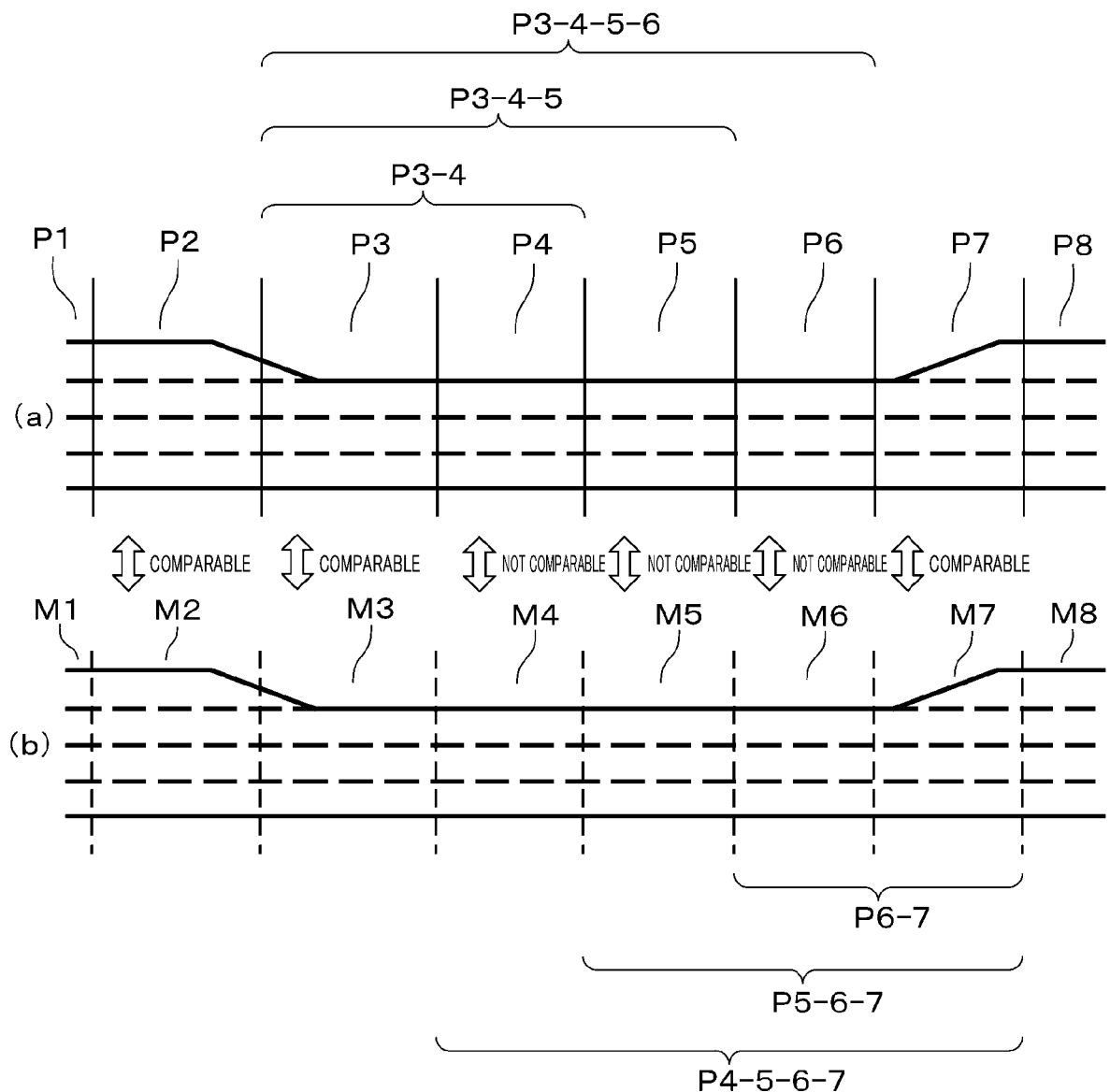
FIG. 6 is a first diagram illustrating a process for aligning probe data with map data and a process for combining probe data.

FIG. 6 illustrates a pattern (a) representing an example of probe data generated from one travel of one vehicle A. In the pattern (a) of FIG. 6, vertical lines indicate boundaries between probe data sets. In this example, eight probe data sets P1, P2, . . . , and P8 are shown, and these probe data sets are transmitted to the data center 2.

The process controller 18 of the data center 2 then aligns the probe data sets P1, P2, . . . , and P8 received from the vehicle A with the map data. FIG. 6 illustrates a pattern (b) representing eight data blocks M1, M2, . . . , and M8 of the map data that correspond to the eight probe data sets P1, P2, . . . , and P8. In this case, the six probe data sets P2, . . . , and P7 obtained by omitting both ends of the eight probe data sets P1, P2, . . . , and P8 are aligned with the six data blocks M2, . . . , and M7 of the map data.

In the above alignment process, the probe data sets P2, P3, and P7 include characteristic information such as pavement marking shapes, or more specifically, data on oblique markings, and can thus be matched, or aligned, with the corresponding data blocks M2, M3, and M7 of the map data.

In contrast, the probe data sets P4, P5, and P6 include no data on characteristic information, or more specifically, they have a straight pavement marking, which makes it impossible to distinguish the probe data sets P4, P5, and P6 from each other. It is thus difficult to compare, or align, the probe data sets P4, P5, and P6 with the corresponding data blocks M4, M5, and M6 of the map data. In this case, although the use of GPS information enables the alignment, the accuracy of the alignment is low. In fact, the alignment based on GPS information is difficult.

In the present embodiment, the probe data sets P4, P5, and P6 including no characteristic information, or the difficult-to-align probe data sets P4, P5, and P6, are merged with the previous or the subsequent probe data set P3 or P7 including the characteristic information, or the alignable probe data set P3 or P7. For example, the probe data set P4 is joined to the previous probe data P3 including the characteristic information into combined probe data P3-4. It is also preferable to join the probe data sets P5 and P4 to the probe data P3 into combined probe data P3-4-5. The probe data sets P6, P5, and P4 may also be joined to the probe data P3 into combined probe data P3-4-5-6.

In some cases, the probe data set P6 may be joined to the next probe data set P7 including the characteristic information into combined probe data P6-7. The probe data sets P5 and P6 may also be joined to the probe data set P7 into combined probe data P5-6-7. The probe data sets P4, P5, and P6 may also be joined to the probe data set P7 into combined probe data P4-5-6-7.

Figure 7:
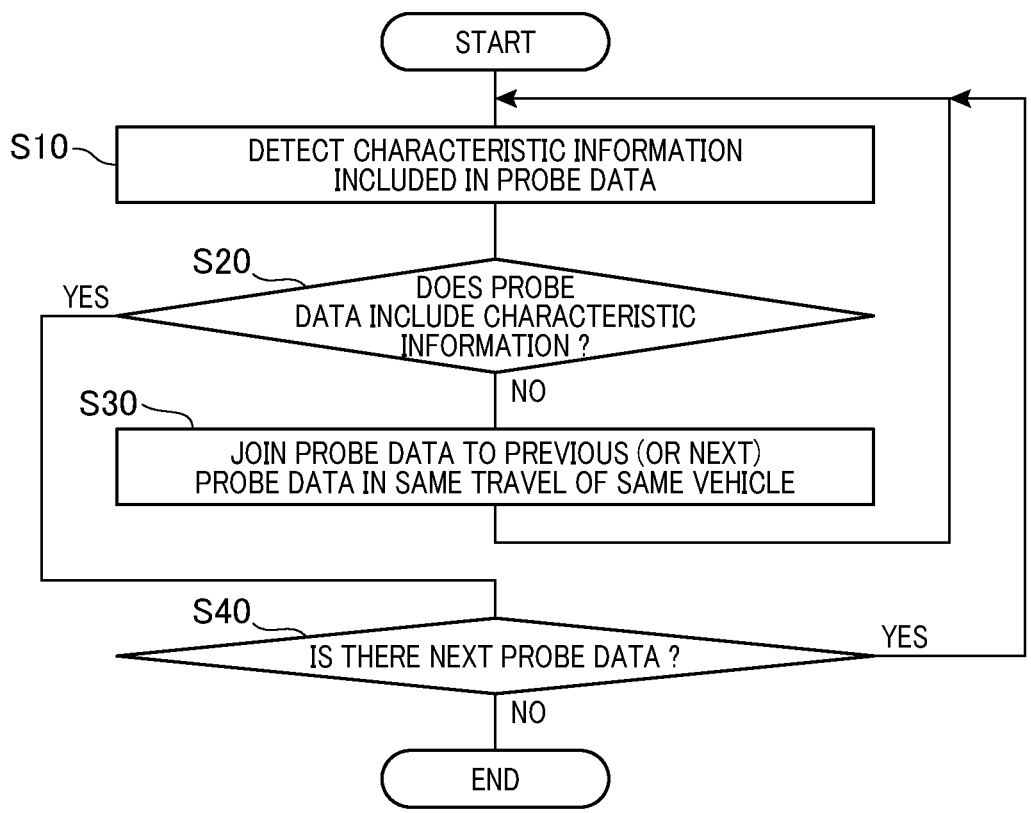
FIG. 7 is a flowchart showing an exemplary process of combining probe data.

FIG. 7 is a flowchart showing exemplary control in a probe data combining process. The flowchart of FIG. 7 shows control performed by the process controller 18 of the data center 2. First, in step S10 in FIG. 7, the process controller 18 detects whether the probe data includes characteristic information such as pavement marking shape information, or in other words, detects the characteristic information in the probe data.

Then, the process controller 18 advances to step S20 and determines whether the probe data includes characteristic information. If no characteristic information is included (NO), the process controller 18 advances to step S30 and combines the current probe data set, that is, the target probe data set with the previous probe data set or the next probe data set in the probe data from the same travel of the same vehicle.

Then, the process controller 18 returns to step S10 and detects whether the combined probe data includes characteristic information such as pavement marking shape information, or in other words, detects the characteristic information in the combined probe data. Then, the above process is repeated. More specifically, the probe data combining process is continued until the characteristic information is found in combined probe data. In the case in which a probe data set including characteristic information has been identified, the process controller 18 may, in step S30, bundle the probe data ranging from the current set to the set contiguous to the probe data set including the characteristic information, and combine the bundled probe data with the target probe data set.

In step S20, if the probe data or the combined probe data includes characteristic information (YES), the process controller 18 skips the probe data combining process to step S40 and determines whether there is a next probe data set. If there is a next probe data set (YES), the process controller 18 returns to step S10 and repeats the above process for the next probe data set. In step S40, if there is no next probe data set, the process controller 18 advances to "NO" and finishes the control processing.

Figure 8:
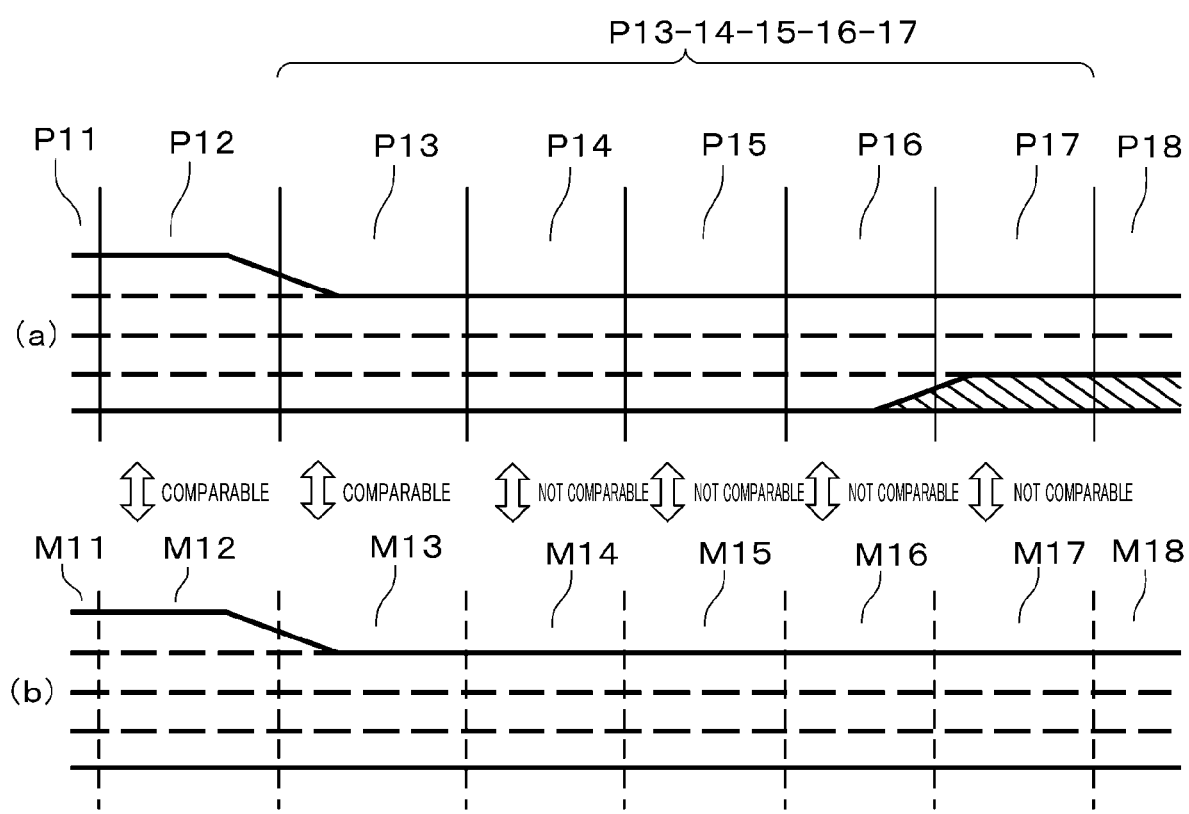
FIG. 8 is a second diagram illustrating a process for aligning probe data with map data and a process for combining probe data.

FIG. 8 illustrates another example of the probe data combining process, such as another example in which pavement marking shape data is used as characteristic information. FIG. 8 illustrates a pattern (a) representing an example of probe data generated from one travel of one vehicle A. In this example, eight probe data sets P11, P12, . . . , and P18 are generated, and these probe data sets are transmitted to the data center 2.

The process controller 18 of the data center 2 then aligns the probe data sets P11, P12, . . . , and P18 received from the vehicle A with the map data. FIG. 8 illustrates a pattern (b) representing eight data blocks M11, M12, . . . , and M18 of the map data that correspond to the eight probe data sets P11, P12, . . . , and P18. In this case, as shown in FIG. 8, the six probe data sets P12, . . . , and P17 obtained by omitting both ends of the eight probe data sets P11, P12, . . . , and P18 are aligned with the six data blocks M12, . . . , and M17 of the map data.

In the above alignment process, the probe data sets P12 and P13 include characteristic information such as pavement marking shapes, or more specifically, data on oblique markings, and can thus be matched, or aligned, with the corresponding data blocks M12 and M13 of the map data.

The probe data sets P14 and P15 include no data on characteristic information, or more specifically, they have a straight pavement marking, which makes it impossible to distinguish the probe data sets P14 and P15 from each other. It is thus difficult to compare, or align, the probe data sets P14 and P15 with the corresponding data blocks M14 and M15 of the map data.

The probe data sets P16 and P17 include characteristic information about the shapes of the pavement markings. More specifically, the probe data sets P16 and P17 include road surface marking data meaning that the road is closed. However, the characteristic information is not included in the corresponding data blocks M16 and M17 of the map data. That is, the above road surface marking data is update data novel to the current map data. Thus, the probe data sets P16 and P17 alone are difficult to compare, or align, with the data blocks M16 and M17 of the map data. In this case, it may be determined that the characteristic information in the probe data sets P16 and P17 is not characteristic information usable for alignment, and the probe data sets include characteristic information insufficient for alignment with the map data. The inclusion of insufficient characteristic information refers to, for example, the presence of one or two, or less than three items of characteristic information. The inclusion of insufficient characteristic information may also mean the absence of characteristic information, or the inclusion of zero characteristic information items.

In the present embodiment, the probe data sets P14 and P15 difficult to align because of the absence of characteristic information, and the probe data difficult to align despite the presence of characteristic information, that is, the probe data sets P16 and P17, which include an insufficient amount of characteristic information, are merged with the previous or the subsequent probe data set including characteristic information usable for alignment, or the alignable probe data set P13.

For example, all the probe data sets P14, P15, P16, and P17 are joined together. Additionally, the four probe data sets P14, P15, P16, and P17 are joined to the probe data set P13 preceding the four combined probe data sets P14, P15, P16, and P17 and alignable because of the inclusion of characteristic information, forming probe data P13-14-15-16-17. If an alignable probe data set follows the four probe data sets P14, P15, P16, and P17, the four probe data sets P14, P15, P16, and P17 may be joined to this subsequent alignable probe data set.

Figure 9:
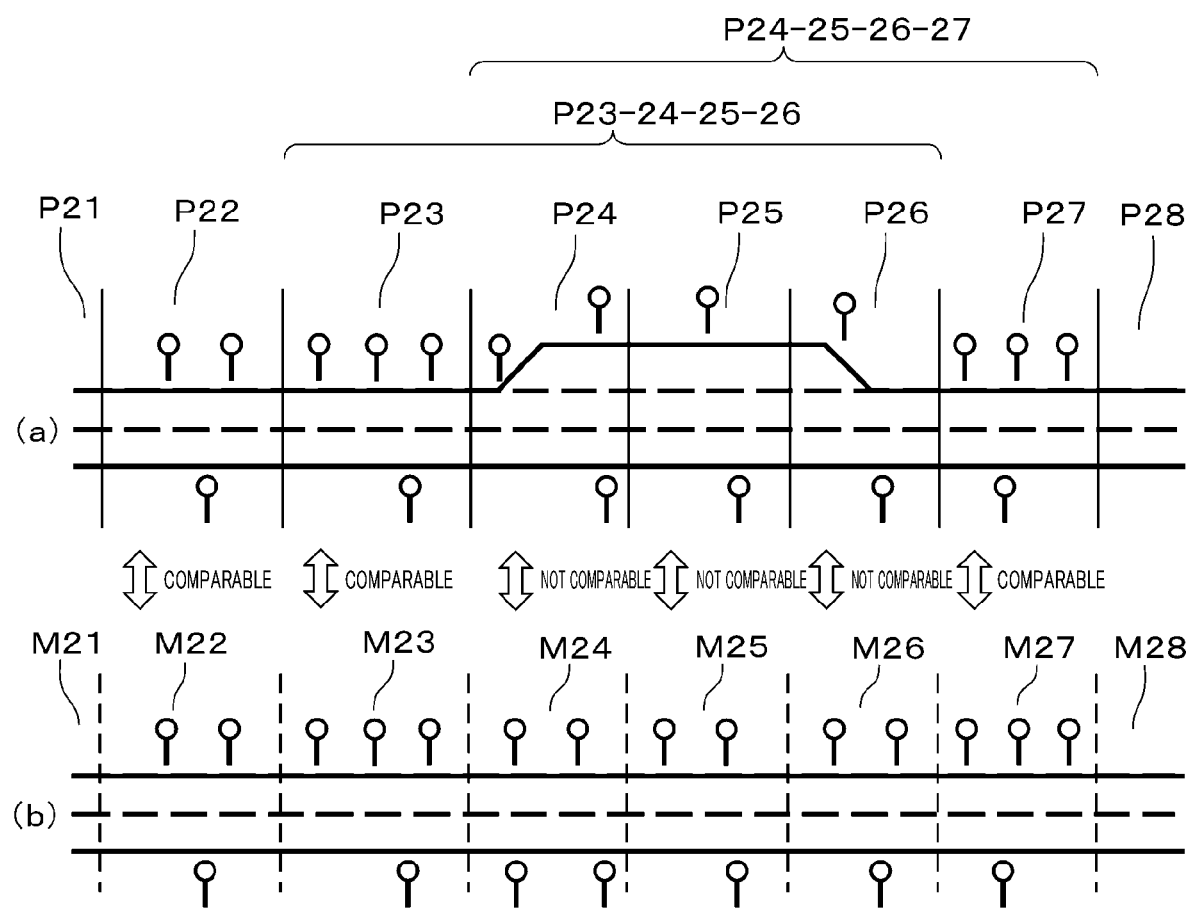
FIG. 9 is a third diagram illustrating a process for aligning probe data with map data and a process for combining probe data.

FIG. 9 illustrates another example of the probe data combining process, such as an example in which road sign data is used as characteristic information. FIG. 9 illustrates a pattern (a) representing an example of probe data generated from one travel of one vehicle A. In this example, eight probe data sets P21, P22, . . . , and P28 are generated, and these probe data sets are transmitted to the data center 2.

The process controller 18 of the data center 2 then aligns the probe data sets P21, P22, . . . , and P28 received from the vehicle A with the map data. FIG. 9 illustrates a pattern (b) representing eight data blocks M21, M22, . . . , and M28 of the map data that correspond to the eight probe data sets P21, P22, . . . , and P28. In this case, as shown in FIG. 9, the six probe data sets P22, . . . , and P27 obtained by omitting both ends of the eight probe data sets P21, P22, . . . , and P28 are aligned with the six data blocks M22, . . . , and M27 of the map data.

In the above alignment process, the probe data sets P22, P23, and P27 include characteristic information such as road sign data, or more specifically, data on the types, the positions, the sizes, and the number of road signs consistent with road sign data included in the data blocks M22, M23, and M27 of the map data to be compared. The probe data sets can thus be matched, or aligned, with the data blocks. In this embodiment, the characteristic information included in the probe data sets P22, P23, and P27 is characteristic information usable for alignment.

The probe data sets P24, P25, and P26 also include road sign data as characteristic information. However, the characteristic information, or the road sign data included in the probe data sets P24, P25, and P26, is inconsistent with the road sign data and the pavement marking shape data included in the corresponding data blocks M24, M25, and M26 of the map data. More specifically, the positions and the numbers of road signs and the pavement marking shapes are inconsistent. Thus, the probe data sets P24, P25, and P26 alone are difficult to compare, or align, with the data blocks M24, M25, and M26 of the map data. More specifically, the characteristic information in the probe data sets P24, P25, and P26 is characteristic information insufficient for alignment. In other words, the probe data sets P24, P25, and P26 include characteristic information insufficient for alignment with the map data.

In the present embodiment, the probe data sets difficult to align despite the presence of characteristic information, that is, the probe data sets P24, P25, and P26, which include an insufficient amount of characteristic information, are merged with the previous or the subsequent probe data set including characteristic information usable for alignment, or the alignable probe data set P23 or P27.

For example, all the probe data sets P24, P25, and P26 are joined together. Additionally, the three probe data sets P24, P25, and P26 are joined to the probe data set P23 preceding the three combined probe data sets P24, P25, and P26 and alignable because of the inclusion of characteristic information, forming probe data P23-24-25-26.

In the present embodiment, the three combined probe data sets P24, P25, and P26 are followed by the alignable probe data set P27. Thus, the three probe data sets P24, P25, and P26 may be joined to the alignable probe data set P27 into combined probe data P24-25-26-27.

Of the three probe data sets P24, P25, and P26, the first probe data set P24 may be joined to the preceding probe data set P23 alignable because of the inclusion of characteristic information. Then, the two following probe data sets P25 and P26 may be joined together, and also the two combined probe data sets P25 and P26 may be joined to the following probe data set P27 alignable because of the inclusion of characteristic information.

Of the three probe data sets P24, P25, and P26, the first two probe data sets P24 and P25 may be joined together, and also the two combined probe data sets P24 and P25 may be joined to the preceding probe data set P23 alignable because of the inclusion of characteristic information. Then, the last probe data set P26 may be joined to the following probe data set P27 alignable because of the inclusion of characteristic information.

Figure 10:
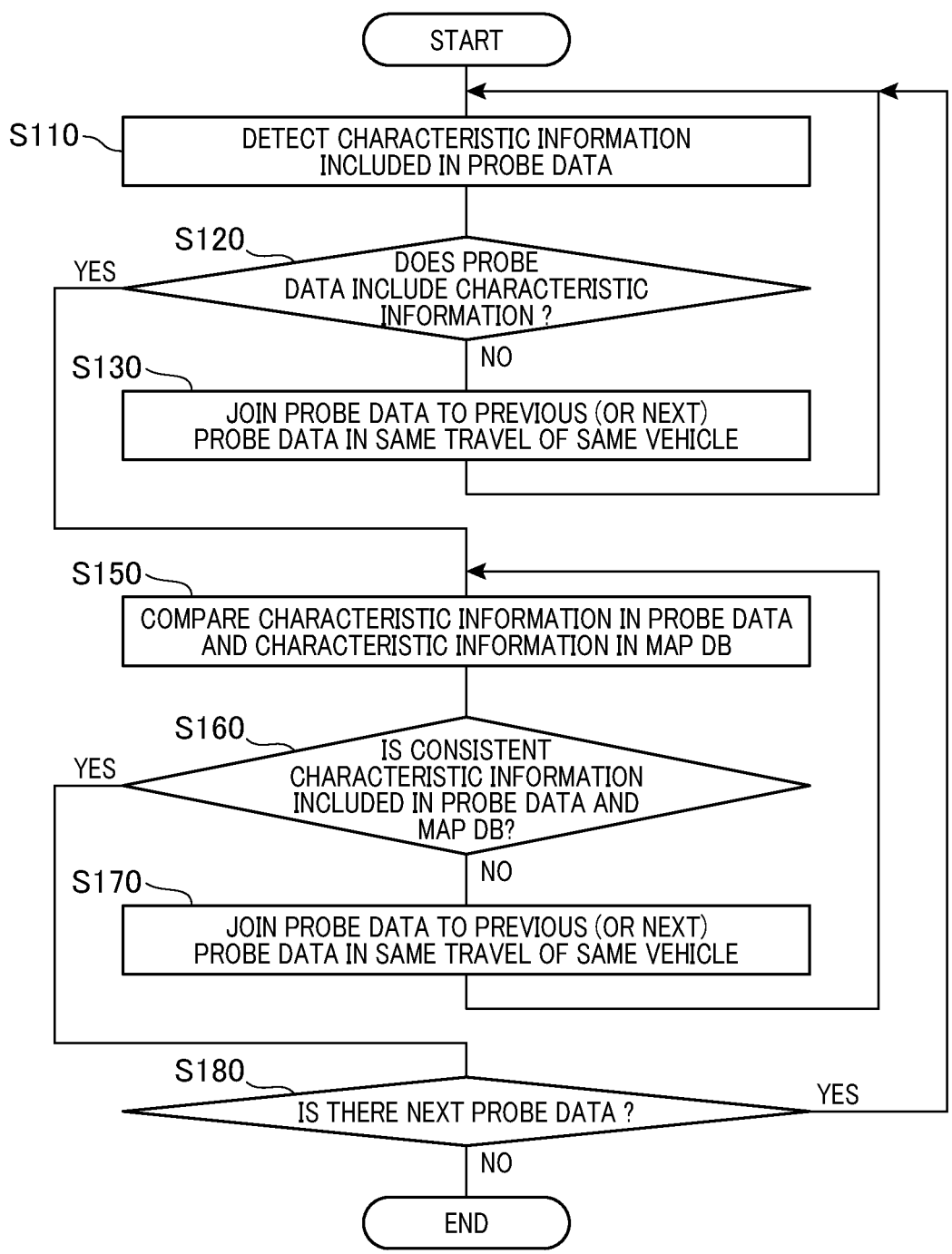
FIG. 10 is a flowchart showing another exemplary process of combining probe data.

FIG. 10 is a flowchart showing exemplary control in the probe data combining process in FIG. 9. The flowchart of FIG. 10 shows control performed by the process controller 18 of the data center 2. First, in step S110 in FIG. 10, the process controller 18 detects whether the probe data includes characteristic information, or in other words, detects the characteristic information in the probe data. Examples of the characteristic information include, as shown in FIG. 11, data on the shapes of pavement markings, data on the line types and the colors of markings, data on ways in which markings are provided, data on road shapes such as a branch, a join, and a curve, data on ways in which road signs are placed, data on the sizes, the types, and the instructions of road signs, data on ways in which signboards are placed, data on the sizes, the types, and the instructions of signboards, and data on ways in which road surface markings are provided. The signboards may be guide signs or commercial signs. The signboard information may preferably include information on characters such as numbers and letters of the alphabet. The characteristic information also includes unalignable characteristic information, that is, characteristic information unusable for alignment.

Then, the process controller 18 advances to step S120 and determines whether the probe data includes characteristic information. If no characteristic information is included (NO), the process controller 18 advances to step S130 and joins the current probe data set to the previous probe data set or the next probe data set in the probe data from the same travel of the same vehicle.

Then, the process controller 18 returns to step S110 and detects whether the combined probe data includes the characteristic information described above, or in other words, detects the above characteristic information in the combined probe data. Then, the above process is repeated. More specifically, the probe data combining process is continued until the characteristic information is found in combined probe data. In the case in which a probe data set including characteristic information has been identified, the process controller 18 may, in step S130, bundle the probe data ranging from the current set to the set contiguous to the probe data set including the characteristic information, and combine the bundled probe data with the target probe data set.

In step S120, if the probe data or the combined probe data includes characteristic information (YES), the process controller 18 advances to step S150. In step S150, the process controller 18 compares the characteristic information, such as road sign data, included in the probe data with the characteristic information, such as road sign data, included in the corresponding data block of the map data to check whether these characteristic information sets are consistent with each other. In this case, the process controller 18 may detect the number of characteristic information items consistent between the characteristic information included in the probe data and the characteristic information included in the corresponding data block of the map data.

Then, the process controller 18 advances to step S160 and determines whether the characteristic information included in the probe data is consistent with the characteristic information included in the corresponding data block of the map data. In this case, the process controller 18 identifies the number of characteristic information items consistent between the characteristic information included in the probe data and the characteristic information included in the corresponding data block of the map data. Then, the process controller 18 determines whether the number of consistent characteristic information items is equal to or greater than the number of data items enough for three-dimensional identification of the probe data, or the data block of the map data, such as three. In the present embodiment, although the process controller 18 determines whether the number of consistent characteristic information items is three or more, this is not restrictive. The process controller 18 may determine whether the number of consistent characteristic information items is two, whether the number is three, whether the number is four, whether the number is five, or whether the number is six or more. That is, in step S160, the process controller 18 determines whether the probe data includes sufficient characteristic information usable for alignment with the map data.

In step S160, if the probe data and the corresponding data block of the map data have inconsistent characteristic information items, that is, there are less than three consistent characteristic information items, or in other words, if the current probe data includes an insufficient amount of characteristic information (NO), the process controller 18 advances to step S170. In step S170, the process controller 18 joins the current probe data set to the previous probe data set or the next probe data set in the probe data from the same travel of the same vehicle.

Then, the process controller 18 returns to step S150 and compares the characteristic information, such as road sign data, included in the combined probe data with the characteristic information, such as road sign data, included in the corresponding data block of the map data to check whether these characteristic information sets are consistent with each other. The process controller 18 then repeats the above process. As a result, the probe data combining process is continued until the characteristic information included in combined probe data becomes consistent with the characteristic information included in the corresponding data block of the map data. In the case in which a probe data set including characteristic information consistent with characteristic information in the map data has been identified, the process controller 18 may, in step S170, bundle the probe data ranging from the current set to the set contiguous to the probe data set including the characteristic information, and combine the bundled probe data with the target probe data set.

In step S160, if the probe data or the combined probe data and the corresponding data block of the map data have consistent characteristic information items, that is, there are three or more consistent characteristic information items (YES), the process controller 18 skips the combining process to step S180 and determines whether there is a next probe data set. If there is a next probe data set (YES), the process controller 18 returns to step S110 and repeats the above process for the next probe data set. In step S180, if there is no next probe data set, the process controller 18 advances to "NO" and finishes the control processing.

In the present embodiment described above, the process controller 18 detects whether probe data includes characteristic information, and joins a target probe data set including no characteristic information to the probe data set previous or next to the target probe data set in the consecutive probe data sets obtained from the same travel of the same vehicle. In this embodiment, the replacement of the unalignable probe data with the combined probe data enables easy and reliable probe data alignment.

In the present embodiment, the characteristic information may be characteristic information usable for alignment of the probe data with the map data. The process controller 18 in this embodiment allows the probe data combining process shown in FIG. 8 and thus enables more reliable probe data alignment.

In the present embodiment, the process controller 18 detects whether the characteristic information included in a probe data set and the characteristic information included in the corresponding data block of the map data include a number of consistent characteristic information items equal to or greater than the number of data items enough for three-dimensional identification of the probe data set. That is, the process controller 18 determines whether the probe data includes sufficient characteristic information usable for alignment with the map data. In the present embodiment, the process controller 18 further joins a target probe data set including a smaller number of consistent characteristic information items than the number of data items enough for three-dimensional identification, or a target probe data set including an insufficient amount of characteristic information, to the probe data set previous or next to the target probe data set in the consecutive probe data sets obtained from the same travel of the same vehicle. The process controller 18 in this embodiment allows the probe data combining process shown in FIG. 9 and thus enables more reliable probe data alignment.

In the present embodiment, the probe data combining process is achieved by the process controller 18 of the data center 2. However, the probe data combining process may instead be achieved by the control unit 11 in the on-vehicle device 3 of each vehicle A. More specifically, the control unit 11 in the on-vehicle device 3 may function as a characteristic determination unit and a combining unit. In such a case, the on-vehicle device 3 of each vehicle A transmits probe data and combined probe data to the data center 2.

Second Embodiment

FIG. 12 illustrate a second embodiment. It is noted that the same components as in the first embodiment are given the same reference numerals. In the first embodiment, as shown in FIGS. 6, 7, 8, 9 and 10, although the probe data sets P1, P2, . . . , and P8 received from one vehicle A are aligned with the map data, this is not restrictive. In the second embodiment, the probe data sets P1, P2, . . . , and P8 received from one vehicle A are aligned with probe data received from another vehicle A, that is, other probe data or other-trip probe data sets P1, P2, . . . , and P8.

More specifically, in the second embodiment, the eight data blocks M1, M2, . . . , and M8 of the map data shown in the pattern (b) of FIG. 6, the eight data blocks M11, M12, . . . , and M18 of the map data shown in the pattern (b) of FIG. 8, or the eight data blocks M21, M22, . . . , and M28 of the map data shown in the pattern (b) of FIG. 9 in the first embodiment may be respectively replaced with eight other-trip probe data sets P10, P20, . . . , and P80, eight other-trip probe data sets P110, P120, . . . , and P180, or eight other-trip probe data sets P210, P220, . . . , and P280 received from another vehicle A before alignment.

FIG. 12 is a flowchart showing control in a probe data combining process in a process of alignment with the eight other-trip probe data sets P210, P220, . . . , and P280, which are substituted for the eight data blocks M21, M22, . . . , and M28 of the map data shown in the pattern (b) of FIG. 9. The flowchart in FIG. 12 shows control performed by the process controller 18 of the data center 2. First, steps S110 to S130 in FIG. 12 are executed in the same manner as steps S110 to S130 in FIG. 10 according to the first embodiment.

Then, the process controller 18 advances to step S250 and compares the characteristic information, such as road sign data, included in the probe data received from one vehicle A with the characteristic information, such as road sign data, included in the corresponding probe data received from another vehicle A, or other-trip probe data, to check whether these characteristic information sets are consistent with each other. In this case, the process controller 18 may detect the number of characteristic information items consistent between the characteristic information included in the probe data received from one vehicle A and the characteristic information included in the corresponding probe data received from another vehicle A. Hereinafter, probe data received from one vehicle A is referred to as first-vehicle probe data, and probe data received from another vehicle A is referred to as other-vehicle probe data.

Then, the process controller 18 advances to step S260 and determines whether the characteristic information included in the first-vehicle probe data is consistent with the characteristic information included in the corresponding other-vehicle probe data. In this case, the process controller 18 may identify the number of characteristic information items consistent between the characteristic information included in the first-vehicle probe data and the characteristic information included in the corresponding other-vehicle probe data, and determine whether the number of consistent characteristic information items is equal to or greater than the number of data items enough for three-dimensional identification of the first-vehicle probe data and the other-vehicle probe data, such as three. In the present embodiment, although the process controller 18 determines whether the number of consistent characteristic information items is three or more, this is not restrictive. The process controller 18 may determine whether the number of consistent characteristic information items is two, whether the number is three, whether the number is four, whether the number is five, or whether the number is six or more. That is, in step S260, the process controller 18 determines whether the first-vehicle probe data includes sufficient characteristic information usable for alignment with the other-vehicle probe data.

In step S260, if the first-vehicle probe data and the corresponding other-vehicle probe data have inconsistent characteristic information items, that is, there are less than three consistent characteristic information items, or in other words, if the current probe data includes an insufficient amount of characteristic information (NO), the process controller 18 advances to step S270. In step S270, the process controller 18 joins the current probe data set to the previous probe data set or the next probe data set in the probe data from the same travel of the vehicle. Furthermore, in step S270, the process controller 18 joins the current other-vehicle probe data set to the previous other-vehicle probe data set or the next other-vehicle probe data set in the other-vehicle probe data from the same travel of the same vehicle.

Then, the process controller 18 returns to step S250 and compares the characteristic information, such as road sign data, included in the combined probe data with the characteristic information, such as road sign data, included in the corresponding combined other-vehicle probe data to check whether these characteristic information sets are consistent with each other. The process controller 18 then repeats the above process. As a result, the process for combining the probe data received from one vehicle A and the process for combining the other-vehicle probe data received from another vehicle A are continued until the characteristic information included in combined probe data becomes consistent with the characteristic information included in the corresponding combined other-vehicle probe data. In the case in which a probe data set including characteristic information consistent with characteristic information in the other-vehicle probe data has been identified, the process controller 18 may, in step S270, bundle the probe data ranging from the current set to the set contiguous to the probe data set including the characteristic information, and combine the bundled probe data with the target probe data set. In this case, it is preferable that the process controller 18 similarly bundle the other-vehicle probe data ranging from the current set to the set contiguous to the other-vehicle probe data set including the characteristic information, and combine the bundled other-vehicle probe data with the target other-vehicle probe data set.

In step S260, if the first-vehicle probe data or the one-vehicle combined probe data and the corresponding other-vehicle probe data have consistent characteristic information items, that is, there are three or more consistent characteristic information items (YES), the process controller 18 skips the combining process to step S180 and determines whether there is a next probe data set. If there is a next probe data set (YES), the process controller 18 returns to step S110 and repeats the above process for the next probe data set.

In step S180, if there is no next probe data set (NO), the process controller 18 advances to step S290. In step S290, the process controller 18 prepares, on a road segment, probe data from multiple vehicles subjected to the combining process as described above, and performs statistical processing on the probe data from the multiple vehicles subjected to the combining process. The statistical processing performed may be, for example, typical averaging or the statistical processing described in Japanese Patent Application No. 2018-163076 previously filed by the applicant. The probe data created by statistical processing performed on the probe data from the multiple vehicles subjected to the combining process is referred to as integrated probe data or statistical probe data. The road segment is a road management unit in map data. Road segments are obtained by dividing a road in accordance with a predetermined rule. Road segments may be obtained by dividing a road at intervals of a predetermined length such as 10 m.

The process controller 18, which performs step S290, corresponds to an integration processing unit that uses the probe data joined to be alignable with other probe data to identify a plurality of probe data sets on a road segment, and performs statistical processing on the plurality of probe data sets to generate integrated probe data. The statistical processing corresponds to averaging the position coordinates of features included in the probe data sets or calculating the median of the position coordinates of the features. The statistical processing on probe data may include averaging the trajectories included in the probe data sets to generate a travel path model.

Then, the process controller 18 advances to step S300 and compares the characteristic information, such as road sign data, included in the integrated probe data with the characteristic information, such as road sign data, included in the corresponding data block of the map data to check whether these characteristic information sets are consistent with each other, before executing an integrated probe data combining process. The integrated probe data combining process is executed in substantially the same manner as steps S150 to S180 in FIG. 10. In this case, the process controller 18 replaces the eight probe data sets received from one vehicle A, which are shown in the pattern (a) of FIG. 9, with the integrated probe data obtained by the statistical processing in step S290, and then performs alignment. After executing step S300, the process controller 18 finishes the control processing.

The process controller 18, in a subsequent process, uses the results of the alignment between the integrated probe data and the map data to detect a part different between the current map data and the integrated probe data. Hereinafter, the different part is referred to as a map change point. The map change point refers to a part that may be different between the current map data and the real world. For example, map change points indicate moved, newly established, and removed features. If there is a map change point, the process controller 18 generates, for example, map data formed by reflecting the map change point in the current map data. In such a process, the process controller 18 can update the map data based on probe data sets uploaded one after another from multiple vehicles. The integrated probe data, which is obtained by integrating a plurality of probe data sets, has a statistical probability higher than each probe data set. Therefore, compared with updating the map data with a single probe data set, updating the map data with integrated probe data will reduce the possibility of erroneously altering the map data. The process controller 18 combines a plurality of probe data sets and performs statistical processing to generate and update a travel path model. More specifically, once a feature or a road shape along a road is changed, the process controller 18 can quickly generate and distribute a travel path model reflecting the change. The trajectories included in probe data sets are combined in the process for combining the probe data sets with each other, and the trajectories included in combined probe data sets are integrated by statistical processing into a travel path model.

The processes and components in the second embodiment other than those described above are the same as in the first embodiment. Thus, the second embodiment can also have substantially the same functional effects as the first embodiment. In particular, in the second embodiment, a plurality of vehicles each provide one probe data set, which is then subjected to the combining process. In addition, these probe data sets are subjected to statistical processing into integrated probe data, which is then aligned with the map data. In this manner, the integrated probe data combining process is executed. This enables easy and reliable execution of the integrated probe data alignment and the combining process.

In each of the above embodiments, although probe data received from one vehicle A is subjected to the probe data combining process as shown in FIGS. 7, 10, and 12, this is not restrictive. Integrated probe data created by statistical processing may also be subjected to the same combining process. In this case, control is preferably performed to execute each step in the flowcharts of FIGS. 7, 10, and 12 with the integrated probe data substituted for the probe data received from one vehicle A.

Although the present disclosure has been described based on the embodiments, it is to be understood that the disclosure is not limited to the embodiments and the structure. This disclosure encompasses various modifications and alterations falling within the range of equivalence. In addition, various combinations and forms as well as other combinations and forms with one, more than one, or less than one element added thereto also fall within the scope and spirit of the present disclosure.

The control unit and the control method described in the present disclosure may be implemented by a dedicated computer including a processor and memory programmed to execute one or more functions embodied by a computer program. Alternatively, the control unit and the control method described in the present disclosure may be implemented by a dedicated computer including a processor formed of one or more dedicated hardware logic circuits. Alternatively, the control unit and the control method described in the present disclosure may be implemented by one or more dedicated computers including a combination of a processor and memory programmed to execute one or more functions and a processor formed of one or more hardware logic circuits. The computer program may be stored in a non-transitory, tangible computer readable storage medium as computer-executable instructions.

What is claimed is:

1. A system comprising:
    a memory having a set of computer-executable instructions stored thereon; and
    a processor communicable with the memory and an on-vehicle device of at least one vehicle, wherein
    the set of computer-executable instructions stored on the memory cause the processor to implement:
    detecting whether a number of characteristic information items consistent between characteristic information included in probe data of vehicle surroundings and characteristic information included in a corresponding data block of map data is equal to or greater than a number of data items enough for three-dimensional identification of the probe data;
    determining that the probe data does not include sufficient characteristic information usable for alignment with the map data in response to detecting that the number of characteristic information items consistent between the characteristic information included in the probe data and the characteristic information included in the corresponding data block of the map data is smaller than the number of data items enough for three-dimensional identification of the probe data;
    joining a target probe data set including the probe data that does not include sufficient characteristic information to a probe data set that is previous or subsequent to the target probe data set in consecutive probe data sets, the consecutive probe data sets comprising a plurality of probe data sets acquired from the at least one vehicle during traveling from engine start to engine stop;

updating the map data based on the joined probe data sets; and transmitting the map data updated based on the joined probe data sets to the on-vehicle device, the map data includes a travel path model, wherein the at least one vehicle is configured to follow travel paths of the travel path model during autonomous driving of the at least one vehicle.

2. The system according to claim 1, wherein
the probe data is successively created based on data provided from at least one of an on-vehicle camera, a millimeter-wave radar system, and a lidar system functioning as an environment monitoring sensor.

3. The system according to claim 1, wherein
the set of computer-executable instructions stored on the memory further cause the processor to implement:
using the joined probe data sets to be alignable with other probe data sets from multiple vehicles including the at least one vehicle to identify a plurality of probe data sets from the multiple vehicles on a road segment, and generate integrated probe data based on the plurality of probe data sets from the multiple vehicles; and
updating the map data further based on the integrated probe data that was generated.

4. The system according to claim 3, wherein the integrated probe data is compared with the map data to detect a map change point.

5. A map generation method implemented by at least one processor for creating or updating map data based on probe data indicating a feature detected in vehicle surroundings by an environment monitoring sensor incorporated in at least one vehicle, the method comprising:

receiving the probe data from an on-vehicle device of the at least one vehicle;

detecting whether a number of characteristic information items consistent between characteristic information included in the probe data and characteristic information included in a corresponding data block of the map data is equal to or greater than a number of data items enough for three-dimensional identification of the probe data;

determining that the probe data does not include sufficient characteristic information usable for alignment with the map data in response to detecting that the number of characteristic information items consistent between the characteristic information included in the probe data and the characteristic information included in the corresponding data block of the map data is smaller than the number of data items enough for three-dimensional identification of the probe data;

joining a target probe data set including the probe data that does not include sufficient characteristic information to a probe data set that is previous or subsequent to the target probe data set in consecutive probe data sets, the consecutive probe data sets comprising a plurality of probe data sets acquired from the at least one vehicle during traveling from engine start to engine stop;

updating the map data based on the joined probe data sets; and transmitting the map data updated based on the joined probe data sets to the on-vehicle device, the map data includes a travel path model, wherein the at least one vehicle is configured to follow travel paths of the travel path model during autonomous driving of the at least one vehicle.

* * * * *